(12) United States Patent
Joseph et al.

(10) Patent No.: US 7,137,727 B2
(45) Date of Patent: Nov. 21, 2006

(54) ELECTRICAL TRACK LIGHTING SYSTEM

(75) Inventors: Mark Joseph, Aspen, CO (US); Janson Simpson, Aspen, CO (US)

(73) Assignee: Litesnow LLC, Aspen, CO (US)

( * ) Notice: Subject to any disclaimer, the term of this patent is extended or adjusted under 35 U.S.C. 154(b) by 0 days.

(21) Appl. No.: 10/378,460

(22) Filed: Mar. 3, 2003

(65) Prior Publication Data

US 2004/0033708 A1 Feb. 19, 2004

Related U.S. Application Data

(63) Continuation-in-part of application No. 09/920,569, filed on Jul. 31, 2001, now Pat. No. 6,540,372.

(60) Provisional application No. 60/222,278, filed on Jul. 31, 2000.

(51) Int. Cl.
*H01R 33/00* (2006.01)

(52) U.S. Cl. ............... 362/648; 362/419; 362/430; 362/449; 439/115

(58) Field of Classification Search ............... 362/419, 362/147, 226, 418, 404, 430, 449, 648, 640, 362/420, 433, 441, 250, 396; 439/110, 111, 439/122, 121, 115
See application file for complete search history.

(56) References Cited

U.S. PATENT DOCUMENTS

| | | | | | |
|---|---|---|---|---|---|
| 4,655,520 | A | * | 4/1987 | Cummings | 439/111 |
| 4,822,292 | A | * | 4/1989 | Thayer et al. | 439/207 |
| 4,931,917 | A | * | 6/1990 | Scherf et al. | 362/371 |
| 5,342,204 | A | * | 8/1994 | Och | 439/39 |
| 5,655,833 | A | * | 8/1997 | Raczynski | 362/419 |
| 5,833,358 | A | * | 11/1998 | Patik | 362/648 |
| 6,170,967 | B1 | * | 1/2001 | Usher et al. | 362/648 |

* cited by examiner

*Primary Examiner*—John Anthony Ward
*Assistant Examiner*—Bao Q. Truong
(74) *Attorney, Agent, or Firm*—Glenn L. Webb

(57) ABSTRACT

An electrical track lighting system. The track lighting system includes a bendable track that includes a foamed adhesive strip on the upper surface separating two conductor rails. The track is cut to length and secured to the desired surface by the adhesive strip. Light fixtures having spring clip members with electrical contact surfaces engage onto the upper surface conductor rails of the track. Low voltage power is supplied to the track from an adhesive mounted transformer/dimmer switch through an adhesive backed power strip with adjustable angle snap connector.

45 Claims, 14 Drawing Sheets

Figure 11
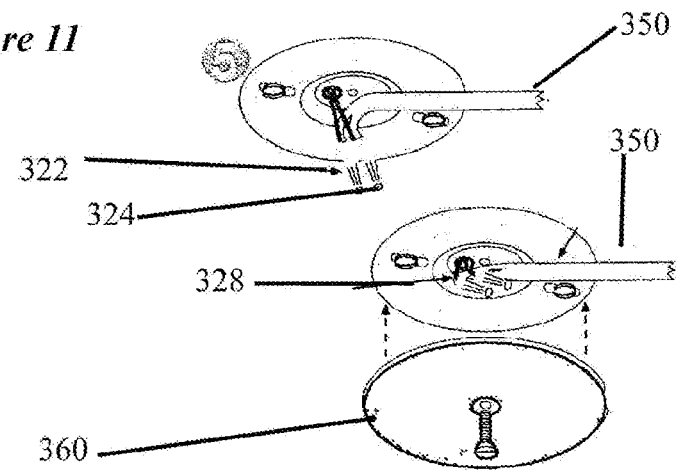
Figure 12
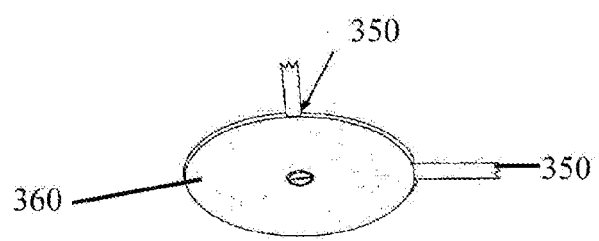
Figure 13
Figure 14
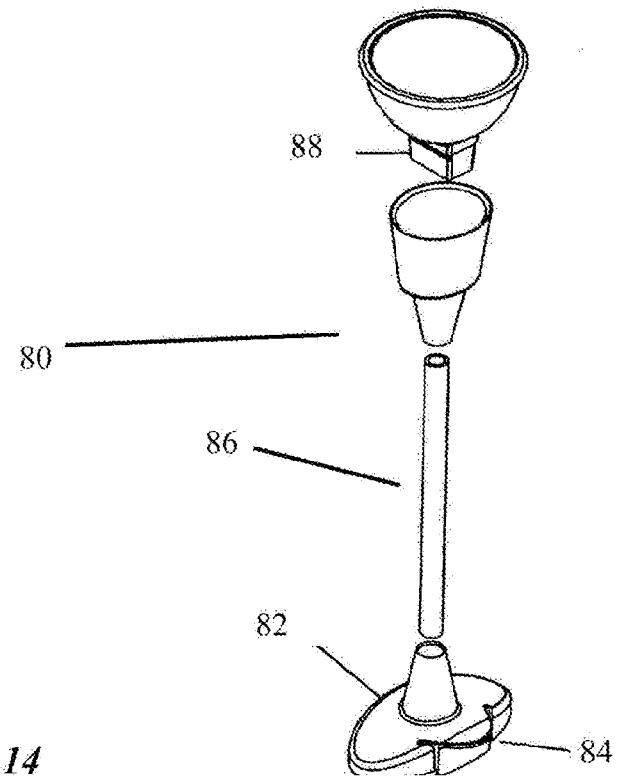

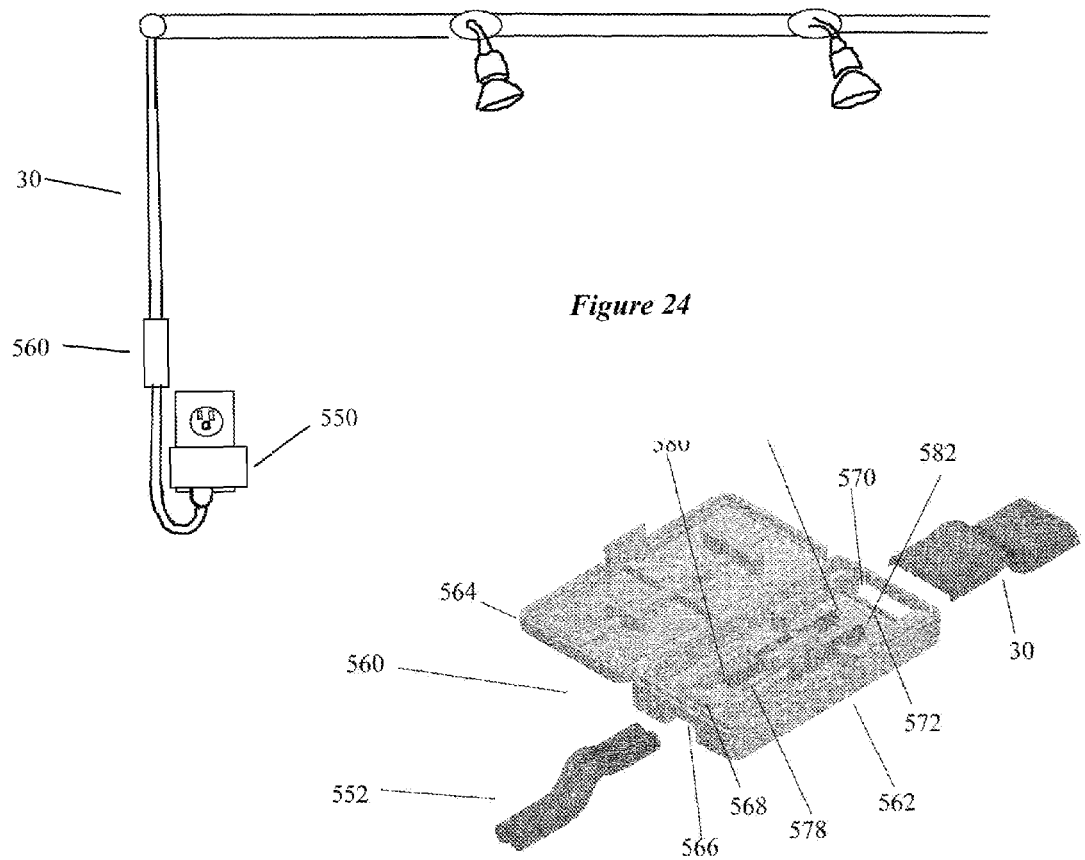
Figure 24
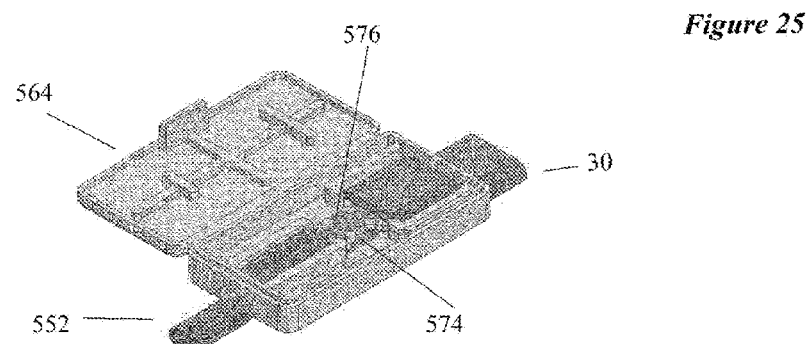
Figure 25
Figure 26

ELECTRICAL TRACK LIGHTING SYSTEM

RELATED APPLICATIONS

This application relates to provisional patent application 60/222,278 filed on Jul. 31, 2000. This application is a continuation-in-part of application Ser. No. 09/920,569, filed on Jul. 31, 2001 now U.S. Pat. No. 6,540,372.

FIELD OF THE INVENTION

This invention relates to the field of track lighting systems.

BACKGROUND OF THE INVENTION

Track lighting systems are well-known for use in interior decorating, display cases, and many other uses. Typical track lighting systems use a track having an interior channel with electrical conductors within the interior channel. Light fixtures usually include two tangs that are inserted into the track interior channel and twisted until contact is made with the electrical conductors. The tracks are normally mounted to a wall or ceiling by mounting screws or hung by a pendant.

These systems are relatively difficult to install. It is necessary to cut the tracks to length with a saw or other tools and install with mounting hardware in the appropriate location. Often, it is difficult to mount the appropriate track in the desired location. Mounting of these tracks to drywall often requires complicated mounting procedures and the use of drywall screws or other hardware components. The fixtures require two hands to install and pivot in the track channel. This can often be difficult to secure due to the height of the ceiling on which the track channel is mounted. Also, the connection may not be correctly made, thus causing arcing of the electrical contacts or even dislodgement of the fixture from the track. Wiring these systems into a junction box can be complicated and dangerous. The track light systems are relatively expensive once all of the components are purchased and installed. Typically, the systems require professional installation, or at the very least, tools such as saws, shears, drills, screwdrivers, as well as other tools and mechanical aptitude.

Another problem with existing track lighting systems is the rigidity of the tracks used in most systems. Many of the tracks used do not allow the tracks to "bend" around corners without using special brackets and fixtures. Even the systems that do allow the tracks to bend only allow the tracks to bend in a lateral direction, not orthogonal to the length of the track (up and down directions). The tracks are unable to be bent to conform to surface irregularities, corners, beams, and curves.

Existing track lighting systems tend to extend downward from ceilings or outward from walls with bulky fixtures. These systems are not suitable for low ceilings, small rooms or other environments where they are obtrusive. The prior systems are relatively high profile in that they do not mount flat to the mounting surface.

There have been a number of attempts previously to solve these problems. However, these attempts have been largely unsuccessful. Thus, a need exists for an electrical track lighting system that is easily installed with little or no tools, relatively inexpensive, bendable around surfaces, low-profile, that requires no hardwiring of electrical connections, that can be simply plugged into an outlet and having instantly installable light fixtures.

SUMMARY OF THE INVENTION

The present invention solves these problems and others by providing a bendable track lighting system. The track lighting system of one preferred embodiment is quickly and easily installed with little or no tools or mechanical aptitude. The track lighting system can be used in almost any location and environment and can be decorated to fit unobtrusively in most decors.

In a preferred embodiment, the track lighting system includes fixtures that are quickly and securely installed on the track. The fixtures can be quickly adjusted to a desired location. In this embodiment, the fixtures can be simply snapped into place and/or removed with only one hand.

In a preferred embodiment, the track lighting system uses low-voltage current for safe and efficient use. The transformer and dimmer are low profile and can be mounted virtually anywhere. These components can be plugged into an outlet or ceiling fixture for easy use or hardwired into a junction box if desired.

The track lighting system of a preferred embodiment uses a double-sided adhesive tape for use with a bendable, extruded plastic track. The track already has adhesive mounted to the surface contact side protected by a release liner. In one embodiment, the track is supplied in rolls and strips are cut to desired lengths. The track can be bent as necessary to conform to corners, beams and irregular surfaces. The flat, smooth surface of the track is very close to the mounting surface so to be unobtrusive as well as painted if desired. Thus, the track is hidden very easily and blends into the environment of the mounting surface. The track thus tends to be low profile against a ceiling or wall.

In a preferred embodiment, the track includes a foam double sided adhesive tape for mounting onto a mounting surface. The foam allows the track to conform to irregular mounting surfaces that no other track is able to do. Also, the foam strengthens the bond by increasing the surface contact on uneven surfaces.

The fixtures, in one preferred embodiment, include spring clip members. These spring clip members securely attach the fixture to the track by engaging the upper side of the track. Contact surfaces on the spring clip members engage conductors on the upper surface of the track to provide current to the light fixture.

In a preferred embodiment, the base of the fixture is molded of a resilient bendable plastic material. The bendable plastic material provides spring pressure to push the spring clips against the contact surfaces by applying pressure on the opposite side of the base.

In another preferred embodiment, an elastomer is biased against the track by the engagement of the spring clip members with the contact surfaces. This minimizes the accidental dislodgement of the fixture and ensures contact between the spring clip members and the conductors on the track.

In another embodiment of the present invention, magnetically oriented members on the track and fixtures ensure alignment of the fixture, polarity of the current and engagement between the fixture and track.

These and other features will be evident from the drawings and the detailed description of preferred embodiments.

BRIEF DESCRIPTION OF THE DRAWINGS

FIG. 11 shows an assembled view of a transformer of a preferred embodiment.

FIG. 12 shows another view of the transformer of the preferred embodiment.

FIG. 13 shows a perspective view of an adaptor for a recessed light outlet of a preferred embodiment.

FIG. 14 shows another view of the embodiment of FIG. 13.

FIG. 24 is a front view of the light system of the embodiment of FIG. 1.

FIG. 25 is an exposed view of the switch of the light system of the embodiment of FIG. 1.

FIG. 26 is another view of the switch of FIG. 25.

DESCRIPTION OF THE PREFERRED EMBODIMENTS

Figure 1:
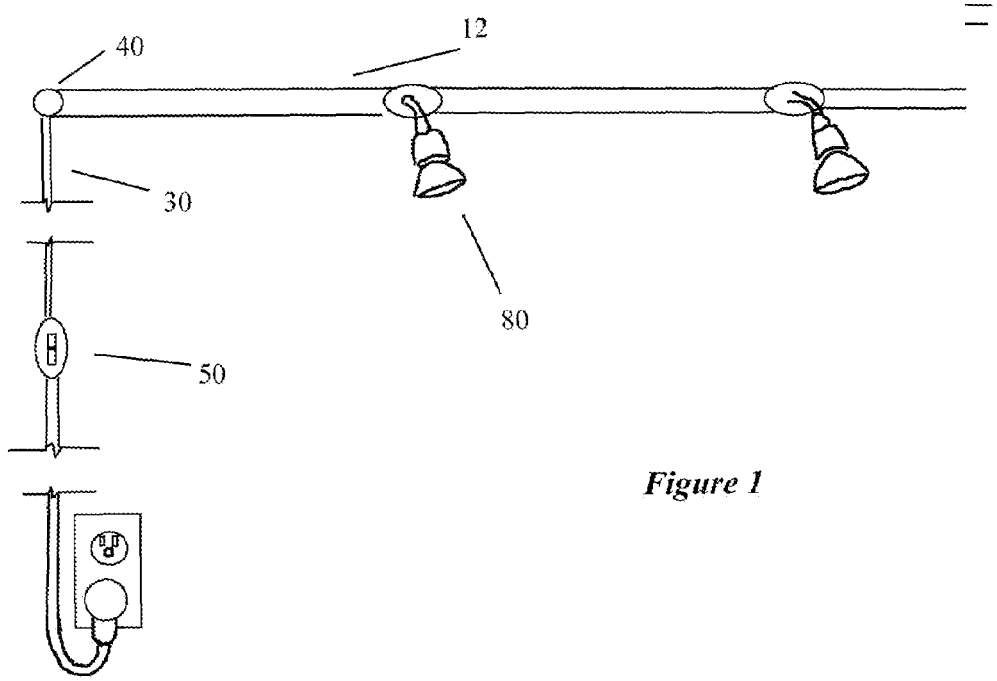
FIG. 1 shows a preferred embodiment of the electrical track system of the present invention.

The present invention provides an electrical track lighting system. It is to be expressly understood that the descriptive embodiments set forth herein are intended for explanatory purposes and is not intended to unduly limit the scope of the claimed inventions. Other embodiments and applications not described herein are considered to be within the scope of the invention. It is also to be expressly understood that while specific embodiments for the components of the electrical track lighting systems are discussed, other equivalents to these embodiments that perform substantially similar functions are within the scope of the claimed inventions.

Several preferred embodiment of the present invention are illustrated in FIGS. 1–22. The electrical track lighting system 10 of a preferred embodiment shown in FIG. 1 includes a bendable track 12 having an adhesive backing, connection clip 40, a power supply 50, and fixtures 80. The system 10 is low profile, that is, the track mounts very close to the flat mounting surface so not to be obtrusive. The system of the exemplary preferred embodiment as described in FIGS. 1–5 is easily mounted with little or no tools other than household scissors or a knife. This system can be bent in an up or down manner so to be mounted around corners, beams, and other irregular and/or uneven surfaces.

Figure 2:
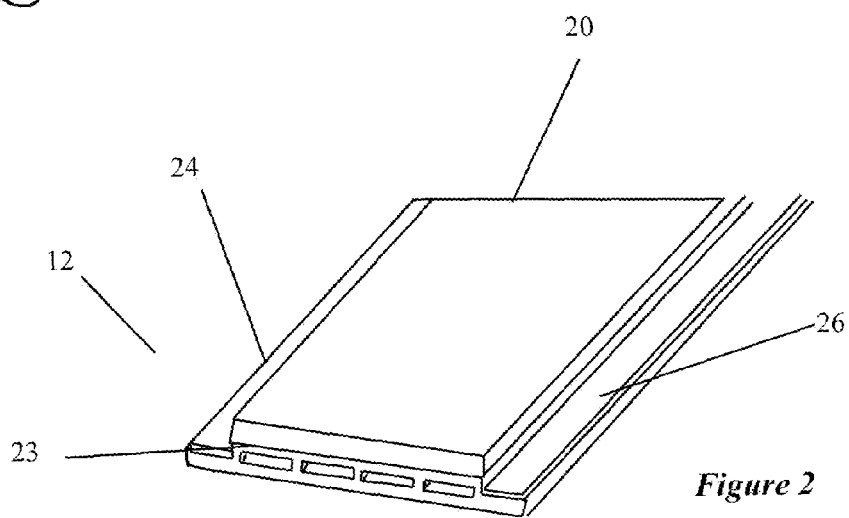
FIG. 2 shows a perspective view of the track of the embodiment of FIG. 1.
Figure 3:
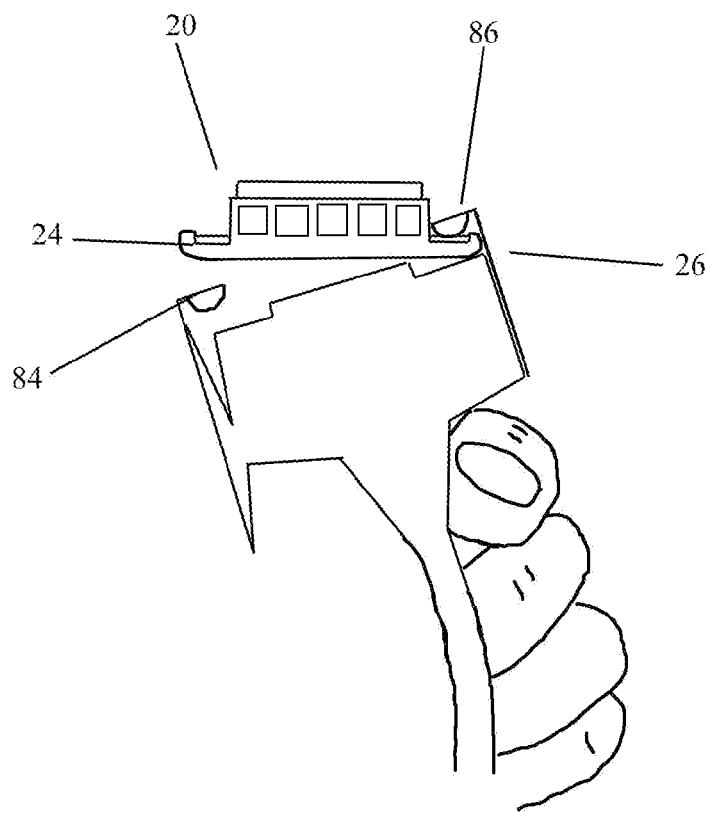
FIG. 3 shows a cross-sectional view of another track of a preferred embodiment of the present invention.
Figure 4:
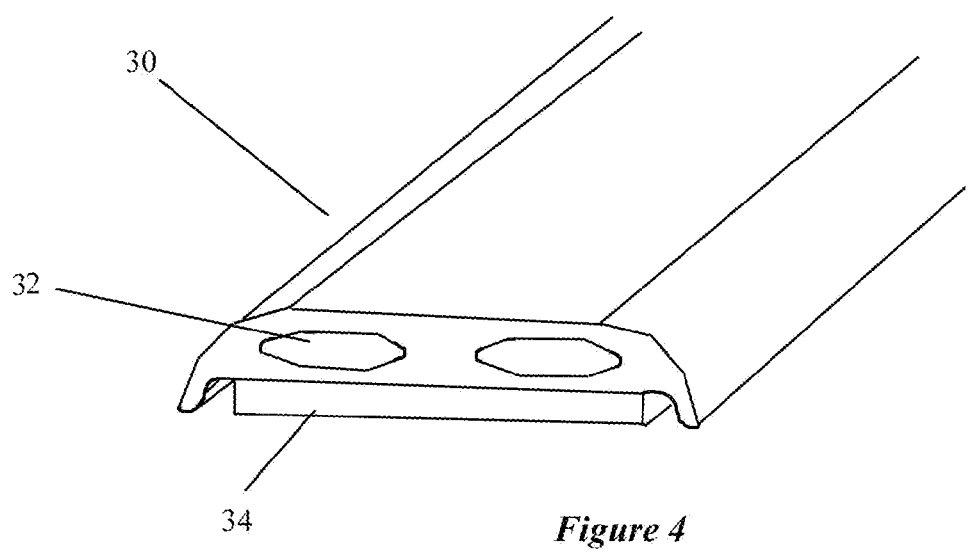
FIG. 4 shows a cross-sectional view of another track of a preferred embodiment of the present invention.
Figure 5:
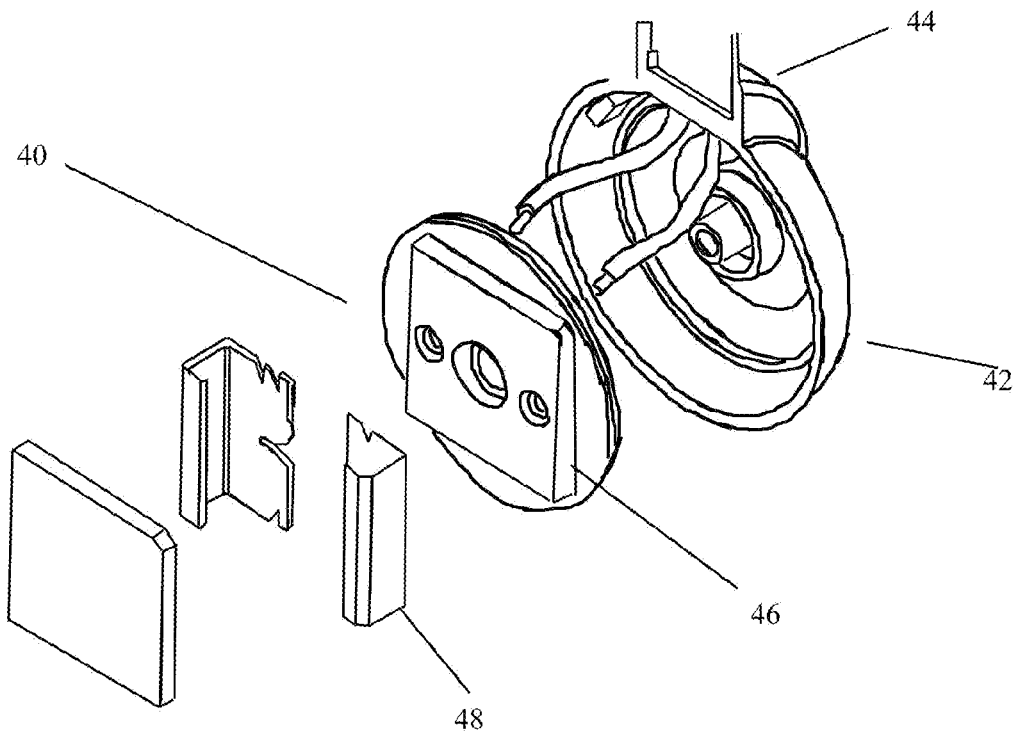
FIG. 5 shows a cross-sectional view of another track of a preferred embodiment of the present invention.

This bendable track 12 is formed of an extruded plastic, magnetic materials or other lightweight bendable strip material. In the preferred embodiment of FIG. 2 the bendable track 12 is formed of extruded hollow plastic material, such as polyvinyl chloride. In other embodiments, the track can be extruded into a "T" shape, as shown in FIG. 3 or in a flat surface as shown in FIGS. 4 and 5. The track 12 shown in FIG. 2 includes hollow portions 120 that act as a "torsion" box. This allows the track to be easily cut with household scissors due to its thin wall profile, but I is rigid torsionally to support weight of fixtures and lamps yet it can be bent by hand. This provides a bendable, yet structurally stiff, lightweight strip material that can be easily bent into position yet has no "memory" and will retain the bent position. It is structurally strong for mounting to walls, ceilings and other surfaces for securely holding light fixtures. The load from the fixtures is spread by a torsionally stiff track over a wide area of mounting tape. It has a thickness of 0.25 inches or less in the preferred embodiment to form a low profile structure with a flat smooth front exposed surface.

It is to be expressly understood that other materials and thickness can be used as well. The bottom exposed surface 14 of track 12 is a substantially flat planar surface. As discussed in further detail below, the smooth flat bottom surface 14 can have decorative tape mounted to it, or even painted as desired. The ability to paint the smooth flat bottom surface 14 of the track 12 as well as the low profile of the track allows it to be easily hidden from sight or else used as an accent for the room.

A double-sided adhesive strip 20, as shown in FIGS. 1–6, is affixed onto the track 12 on the upper side 16 of the track 12 between the track and the mounting surface. The adhesive strips 20 are preferably attached to both sides of a foam material 23 having a thickness of about 0.1 inches, although other dimensions can be utilized as well with an adhesive layer. The foam material 23 allows the secure fastening and use of the track 12 on uneven surfaces. The foam conforms to uneven surfaces and increases the bonding with the mounting surface by increasing the adhesive surface area contact. The soft foam also reduces the pressure needed to apply the track to surfaces, thereby making it easier to apply by hand. The adhesive strip 20 can also be integrally formed as part of the track 12. The adhesive strip 20, in this particular embodiment, is formulated of a particularly aggressive adhesive that can support the track 12 on any surface. In other preferred embodiments, the adhesive may be of a less aggressive nature in order to allow easy removal for temporary use. Prior to installation, the adhesive strip includes a protective layer 22, such as a silicon-coated paper that prevents the adhesive from adhering to unintended surfaces until the track 12 is ready to install. In a preferred embodiment, adhesive strip 20 is integrated directly into the track 12, while in the exemplary preferred embodiment, the adhesive strip 20 is mounted onto the upper side 16 of track 12. In another embodiment, the adhesive strip includes a double-sided adhesive strip covered by a protective layer. The track 12 is cut to the appropriate length for use, then the adhesive strip is applied to the track and to the ceiling or wall location.

Electrical contact rails 24, 26 are mounted or formed on the upper side 16 of track 12. In the embodiment shown in FIG. 2, the contact rails are mounted to the track 12 snapping or pressing into a formed slot. The contact rails may also be mounted to the track by a thin adhesive layer or even formed as an adhesive sided tape. The contact rails may also be co-extruded with the plastic track. The contact rails 24, 26 are formed of conductive materials, such as copper, brass, aluminum or other known conductive materials. The contact rails 24, 26 are parallel and spaced from one another as well. The rails are electrically insulated from one another through the insulation properties of the track 12. The contact rails 24, 26, in the preferred embodiment, are flat copper, but could also be round, square or other shapes and sizes of exposed electrical wire as well. The contact rails extend the full length of the track 12. The flat copper rails of the preferred embodiment not only provide a low profile structure but also enable the use of common household scissors to cut the track to length. The flat copper rails are easier to cut with scissors than the same gauge of round electrical wire used in most tracks systems.

In another preferred embodiment, the track 12 includes multiple sets of contact rails. These rails are spaced from one another and enable multiple groups of light fixtures to be installed on the track. Different switches control the electrical current to these different sets of rails. This enables a user to turn on and off and even dim different lights on the same track.

In the preferred embodiment, the adhesive strip 20 performs several important functions. One of these functions includes the mounting of the track 12, as discussed above. Another important function, in one preferred embodiment is the insulation between the contact rails 24, 26 and, as discussed above, different sets of contract rails. The adhesive strip insulates between these conduct rails. Another function provided by a preferred embodiment of the adhesive strip is to provide spacing and thickness for the track lighting system, as shown in FIGS. 2–4. The adhesive strip can be provided in the desired thickness and height, particularly for providing spacing from the surface onto which the system is being mounted. The system may even include additional adhesive strips that may be mounted onto adhesive strip 12 to provide additional spacing for the system. Also, the foam of the adhesive strip is able to easily mount on uneven surfaces as well.

The adhesive strip 20 along with the bendable track 12 enables the lighting system to be easily installed onto almost any surface, contour, ridge, corner, wall, etc. The combination of the track, foam, and adhesive strip is bendable and can be easily bent by hand as needed.

Figure 7:
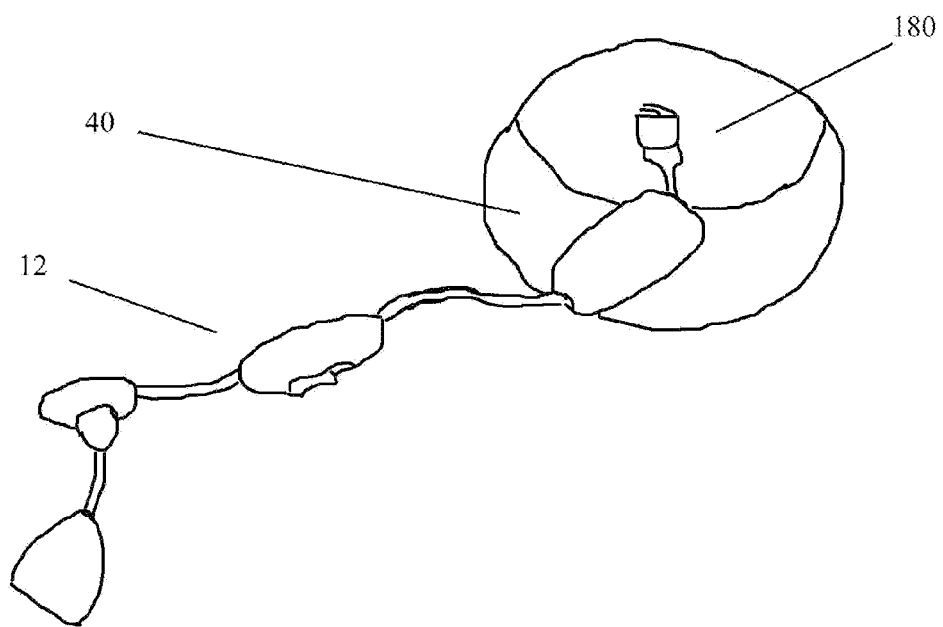
FIG. 7 shows a perspective view of the power strip of a preferred embodiment.

Electrical current is supplied to the contact rails 24, 26 of the track 12 by the adhesive backed power strip 30. A preferred embodiment of the low profile power strip 30, as shown in FIGS. 1 and 7, is connected between the transformer 50 and the track 12. The power strip 30 carries flattened electrical leads 32, 34, and is low profile with upper radiused corners. The flattened electrical leads not only provide a lower profile structure but are easier to cut with household scissors or knives. The bottom surface of the power strip is hollow and includes an adhesive backing tape 20. These features provide a low profile, unobtrusive power strip that can be painted to match the wall, ceiling or other mounting surface. Also, the power strip is relatively soft and pliable so that it may be bent to a desired angle and secured in place by the adhesive mounting of the power strip.

Figure 8:
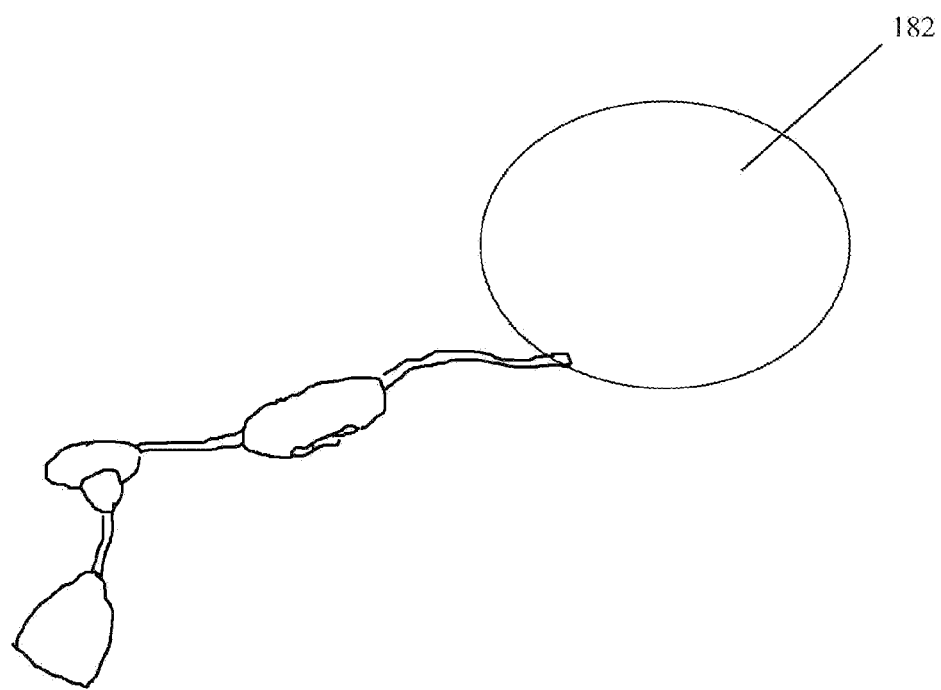
FIG. 8 shows a perspective view of a connection clip of the preferred embodiment of FIG. 1.

The power strip 30 is connected to the contact rails 24, 26 of the track by a connection clip 40. The connection clip 40 can also be used for connecting the tracks to the power strip at any angle to one another. Connection clip 40, as shown in FIG. 8 includes a pivotable housing. The housing 42 is able to rotate about base plate 46. The pivotable housing enables the power strip to swivel to any angle to improve the ease of mounting the track lighting system.

Figure 9:
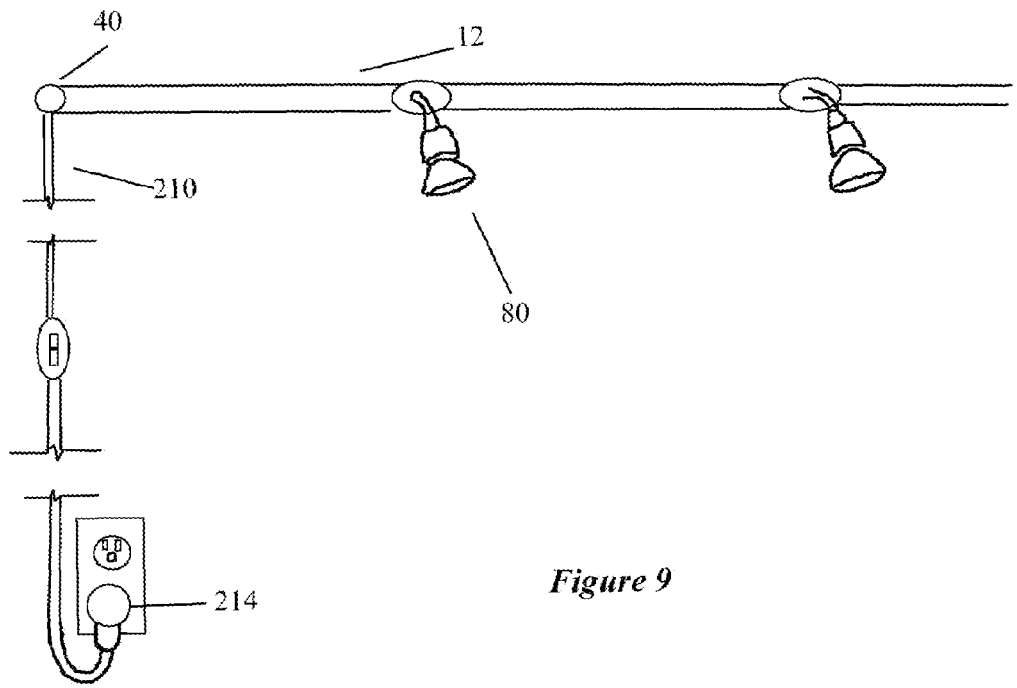
FIG. 9 shows a perspective view of a connection clip of another preferred embodiment.

Another embodiment of a connection clip of the present invention is shown in FIG. 9. The connection clip 400 includes a bendable insulated conductor 402 that allows tracks 12 to be connected together or to transformer 50. The bendable conductor 402 enables the connection clip 400 to be curved or angled to allow tracks 12 to be an angle to one another, to be connected to multiple tracks in a "T" formation, to rise over ridges, or to be connected in a straight connection. Connection clip 400 includes electrical contact leads 404, 406 attached to the electrical contact rails 24, 26 on track 12. In a preferred embodiment, these contact leads 404, 406 are formed into spring clips for ease of attachment to the tracks. However, other securing devices may be used as well.

It is to be expressly understood that other mechanisms for engaging the contact leads with contact rails 24, 26 are also contemplated, such as by direct attachment through soldering; by clips, by piercing and other mechanisms. The connection mechanism may also include a pivot point to allow the tracks to be angled or bent.

Figure 10:
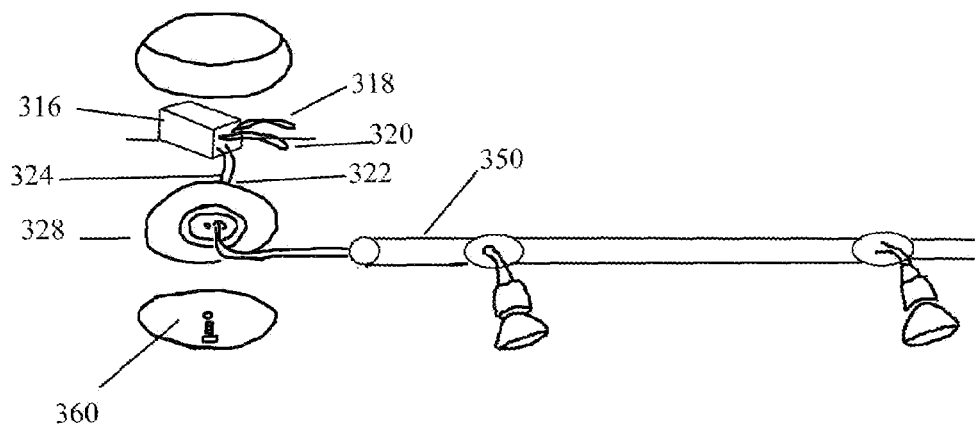
FIG. 10 shows a cross-sectional view of the transformer of the preferred embodiment

In the preferred embodiment, an electrical power transformer and switch is plugged into an AC electrical outlet or wired directly into the household AC current. The AC current is transformed by electrical transformer 54 in the power supply 50 into low voltage current. This current is sent through power strip 30 and clip 40 and then applied to the contact rails 24, 26. A preferred embodiment of the power supply 50 is shown in FIGS. 10–12. The power supply 50 also includes a dimmer switch to adjust the brightness of the light fixtures as well as turn the fixtures on and off. In this embodiment, power supply 50 includes an adhesive backing to allow it to be attached to a convenient location on a wall.

A preferred embodiment of the present invention includes a power switch/supply that is mounted in place with an adhesive strip on its back plate. A power cord that includes an adjustable length cord and outlet plug is used to allow the placement of the power supply at any desired location. The power cord is trimmed to length with scissors or a knife and inserted into the outlet plug. A similar mechanism is used inside of the power supply/switch to form an electrical connection with the power strip. A wedge (not shown) is used to cause piercing of the power strip by contacts within the power switch. This mechanism allows the power supply/switch and other components to be easily mounted at desired locations by the user.

It is to be expressly understood that any standard transformer power switch could be used with the present invention. Another preferred embodiment of the power switch is shown in FIGS. 10–12. Power supply 50 includes a cover 52 having radiused corners that is secured to a back plate 76. The radiused corners of the cover form a smoother transition between switch 80 and the mounting surface so as to make the unit difficult to knock off the wall. An adhesive strip on the back plate mounts the power switch to a wall or other surface. Transformer 54 is mounted with a printed circuit board 68 and printed circuit board copper etch pattern 70. A line switch 74 is also mounted adjacent the transformer and on the printed circuit board with line switch contacts 72. A potentiometer 58 is mounted to the line switch to act as a dimmer. Lever 56 is connected to the potentiometer 58 and extends through housing 52. Line in wedges 60, 54 are mounted adjacent the line switch 74. Line in pairs 62 and 66 provide an electrical connection between the line switch 74 and the line in cord 78 and power strip 30, respectively. The lever 56 is moved up and down so that the potentiometer adjusts the amount of electrical current supplied to the transformer that then transforms the current to low voltage current to the power strip 30.

The power connection wedges 60, 64 allow a user to simply cut the line in cord and/or the power strip to length and insert through slots in the back plate 76. The wedges are pressed inward, as shown in FIG. 12 until the line pairs 62, 66 pierce the insulation to form an electrical connection. Both the power cord and strip can be cut to desired lengths to place the components as desired. For example, the power supply/switch may be mounted close to an electrical outlet by cutting the power cord to a short length and connecting to the outlet plug while the power strip may be cut to a long length and connected to the connection clip. Another mounting scenario may have the power cord cut short and connected to a junction box in the ceiling with the power strip cut short as well. There are an infinite number of possibilities of mounting the components of the system by the adjustable length power strip, the adjustable length power cord, the angularly adjustable connection clip and the bendable power strip.

In another preferred embodiment, shown in FIGS. 13 and 14, the track lighting system includes an adaptor for enabling the system to be connected to an existing lighting system. As shown in FIGS. 13 and 14, the system includes track 12, connection clip 44, fixture 46, and fixtures 50. An adaptor 180 is also included that connects into an existing electrical light outlet, including ceiling outlets, ceiling can outlets, wall outlets, wall sconces and any other standard incandescent light outlet. A cover 182 is also included as well. In use, the adaptor is screwed into the light outlet, such as in a recessed ceiling can type outlet. The power cord is connected to the adaptor along with the transformer. The cover 182 covers these components, as shown in FIG. 14. The cover is attached, such as by an adhesive strips, hook and loop type fasteners, or other fasteners, for easy access. The cover can be painted to match the ceiling color so not be easily visible. The track, connection clip and fixtures are secured as in the other disclosed embodiments.

Figure 15:
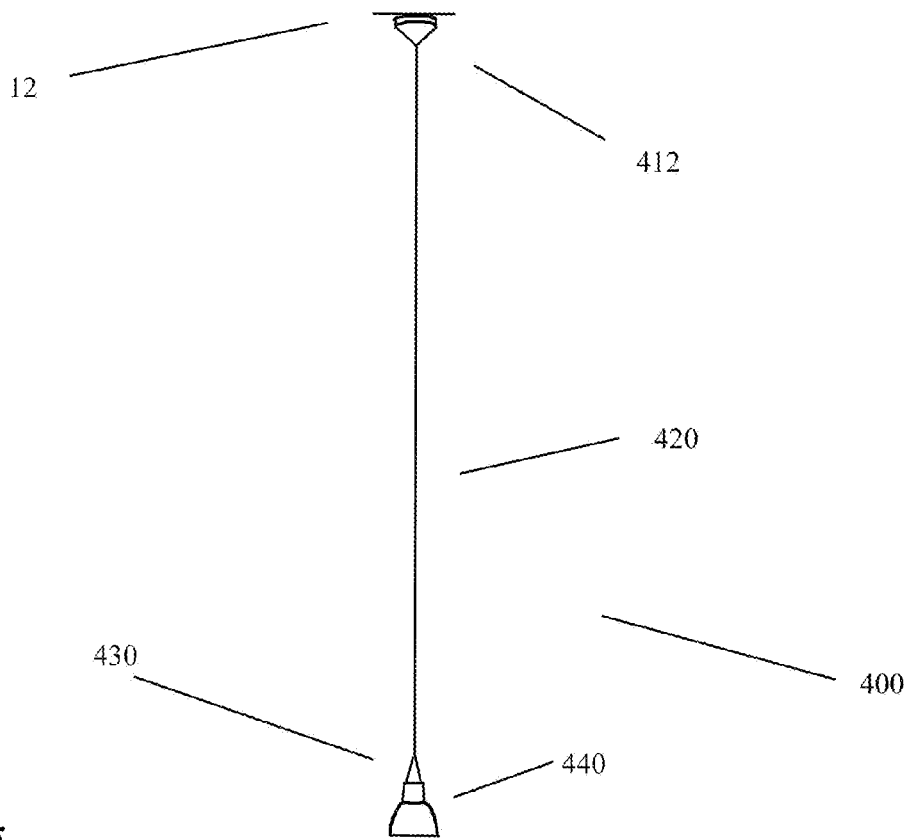
FIG. 15 shows a perspective view of a light fixture of the embodiment of FIG. 1.
Figure 16:
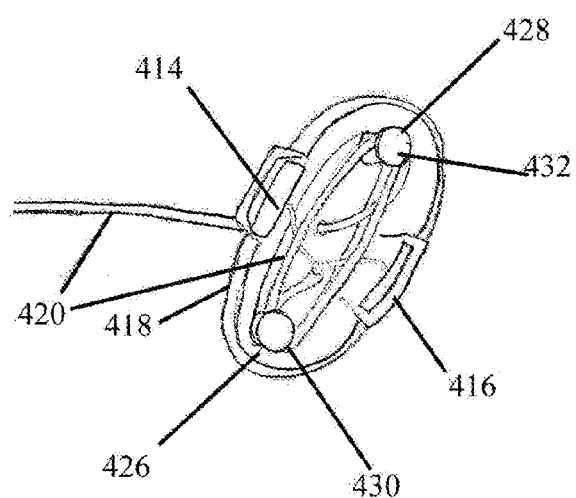
FIG. 16 shows another preferred embodiment of the light fixture.
Figure 17:
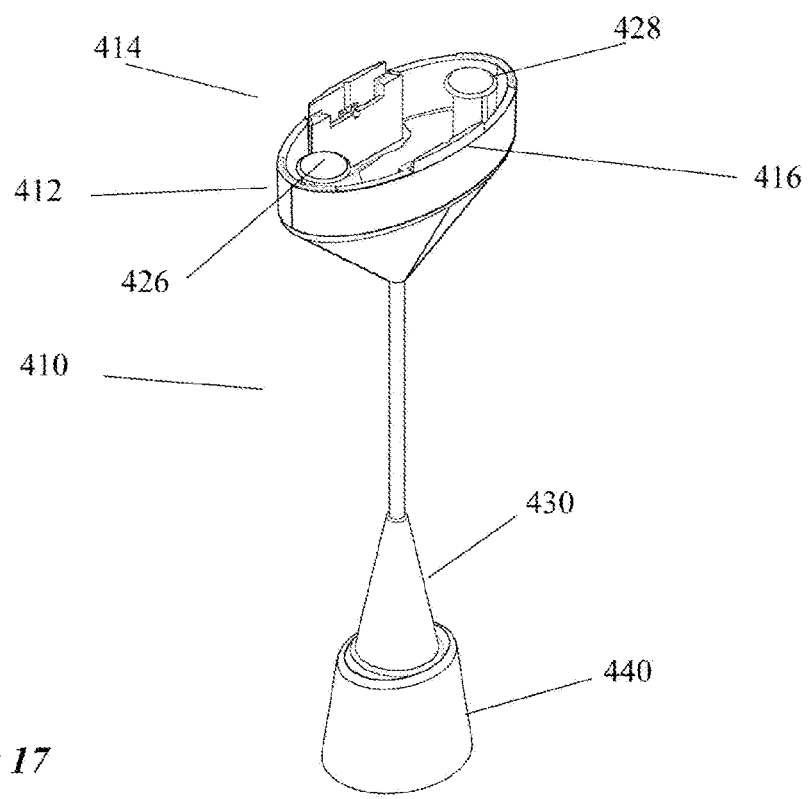
FIG. 17 shows another preferred embodiment of the light fixture.

The exemplary preferred embodiment of the light fixture is shown in FIG. 15. Light fixture 80 includes a base member 82 formed of a high strength resilient plastic material. Clip 84 is formed on one side of the base member. A bendable tube 86, formed of a braided metal material, plastic, or other bendable material extends from the base member 82 to a lamp holder 508. This tube or wand 86 is flexible to allow easy aiming of the light beam. A lamp socket having elongated wires extend through the bendable tube 86 for engagement with contacts that then engage with the contact rails of the track 12. Assembly wires 90 may also be used to provide structural integrity for the tube 86 to hold the lamp fixture together. In use, the user simply engages one side of the base member over the track 12 and snaps the other side over the other side of the track. The clip 84 may be used to ensure engagement or to release the lamp fixture from the track 12.

In this preferred embodiment, the base member 82 of the light fixture is formed of a molded resilient flexible plastic material. This material provides a spring pressure to push the spring clips against the contact surfaces by applying pressure on the opposite of the base member. It is also to be understood that the base member could be a stiff, rigid material and the spring clips themselves provide the resilient force.

In another preferred embodiment, the lighting system also includes fixtures 800. Fixtures 800, in the preferred embodiment shown in FIGS. 16–22, include low-voltage bulb holder 802, having a low voltage bulb 804, such as a halogen bulb, installed therein. The base 806 of fixture 800 also includes spring clip members 808, 810 formed of an electrically conductive material. These members 808, 810 may have an insulation cover as well. The spring clip members have contact surfaces 812, 814 for engagement with contact rails 24, 26 on track 12. The fixture may include a bendable body portion, either mounted on swivel joints, an elastomer body or bendable body, to allow the light fixture to be oriented in a desired direction.

In this preferred embodiment, the spring clip members are formed of spring sheet metal contact material. A thumb tab 816 or pull ring is affixed on spring clip member 808. A molded elastomer material 818 separates the two spring clip members 808, 810 to insulate the clip members. Plastic rivet 820 or other attachment mechanism attaches the spring clip members and the elastomer 818. Contacts 822, 824 attach to the bulb holder 802.

Figure 18:
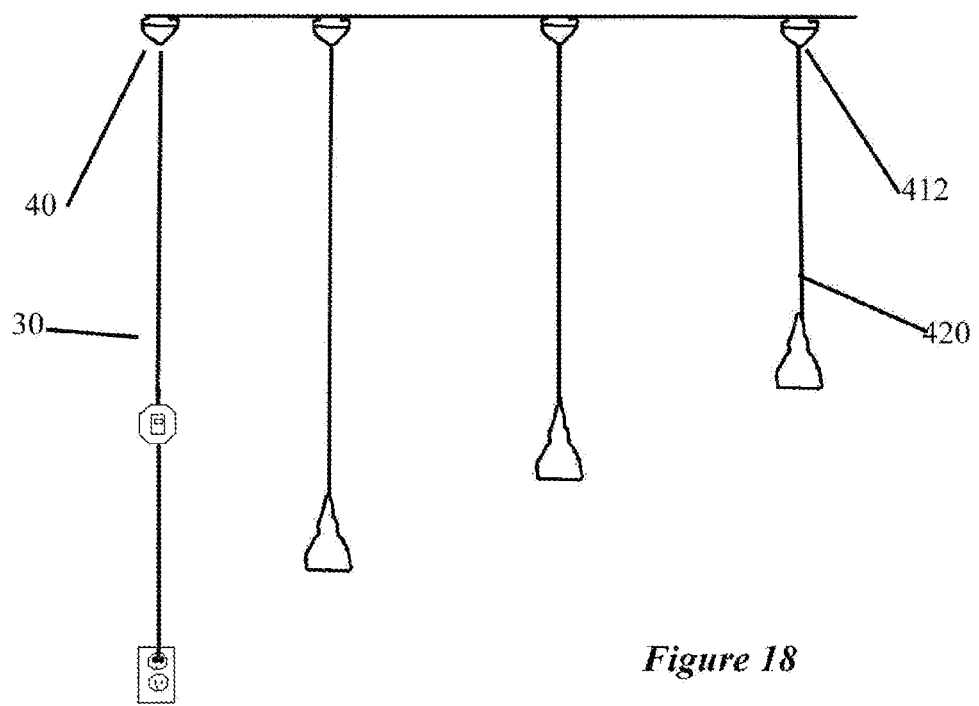
FIG. 18 shows the light fixture being assembled onto the track.
Figure 19:
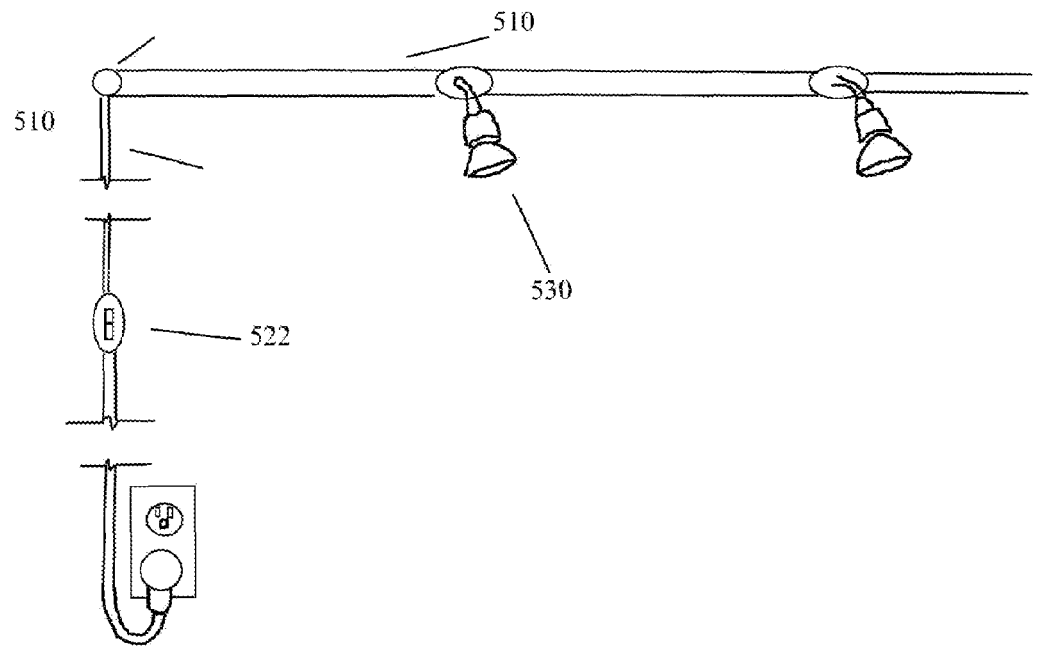
FIG. 19 shows the light fixture partially mounted on the track.
Figure 20:
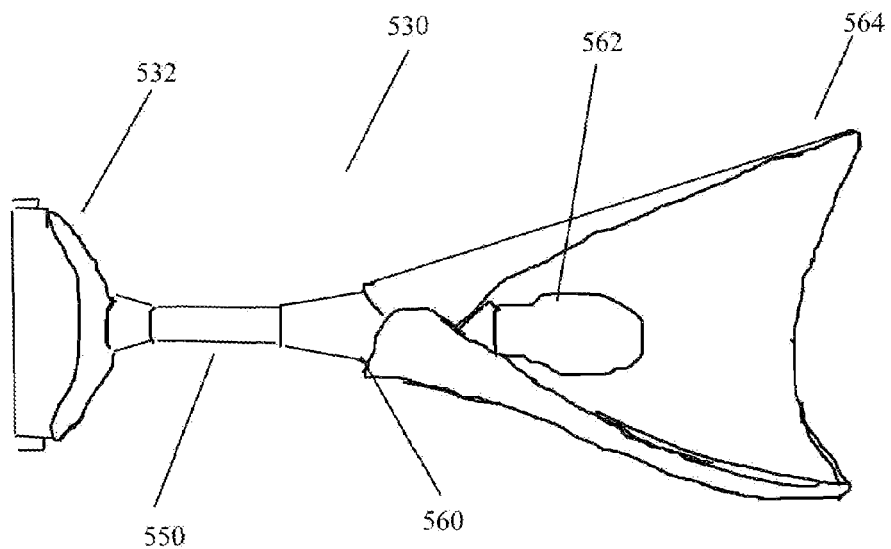
FIG. 20 shows the light fixture securely mounted on the track.

In use, fixture 800, as shown in FIGS. 18–20, is grasped between thumb and finger. Spring clip member 808 is engaged over contact rail 24 as the fixture 800 is pivoted until spring clip member 810 engages over contact rail 26. The pressure from the spring clip members 808, 810 forces the elastomer 818 against the lower surface of the track. The resilient bias from the elastomer 818 against this surface ensures constant contact between the contact rails 24, 26 and the spring clips 808, 810.

The fixture 800 is easily removed from the track by engaging the thumb tab 816 to pull the spring clip member 808 away from the contact rail 24. This releases the fixture from the track.

Figure 21:
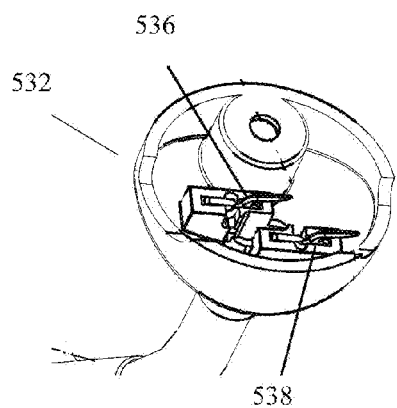
FIG. 21 shows an alternative embodiment of the light fixture of the present invention.
Figure 22:
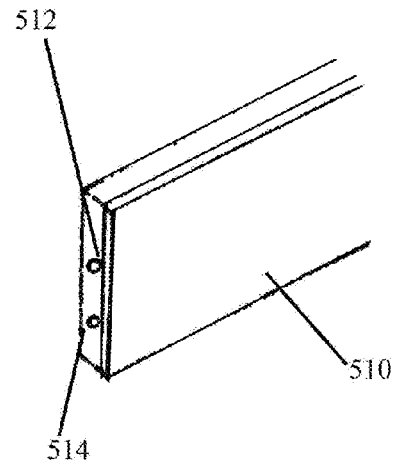
FIG. 22 shows the embodiment of the fixture of FIG. 20 on the track of the electrical light system of the present invention.
Figure 23:
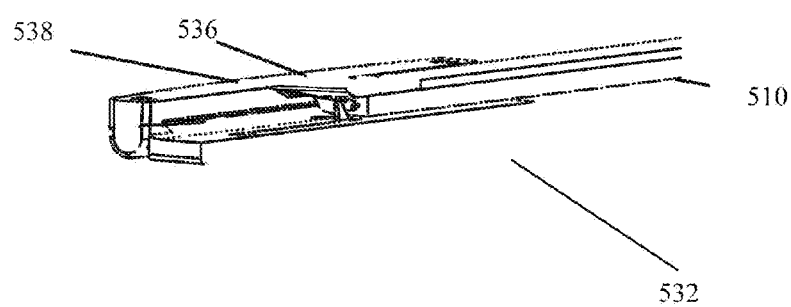
FIG. 23 is a cutaway view of the track system of FIG. 22.
Figure 27:
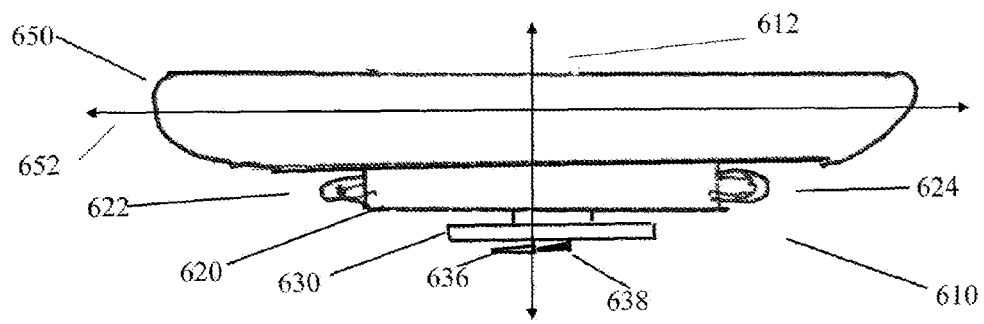
FIG. 27 is a side view of a pivotable light fixture for use on the embodiment of FIG. 1.
Figure 28:
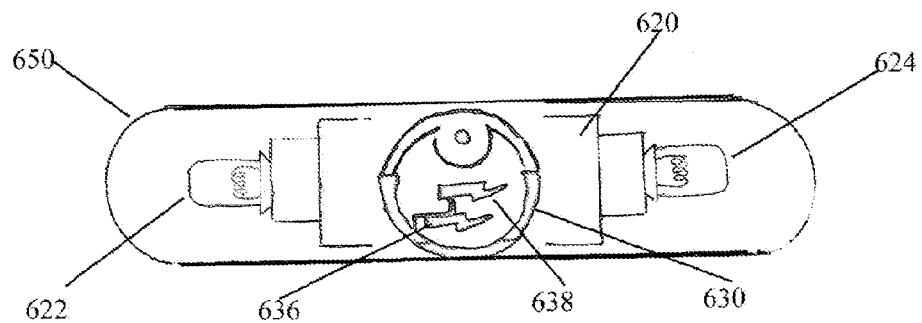
FIG. 28 is a bottom view of the light fixture of FIG. 27.
Figure 29:
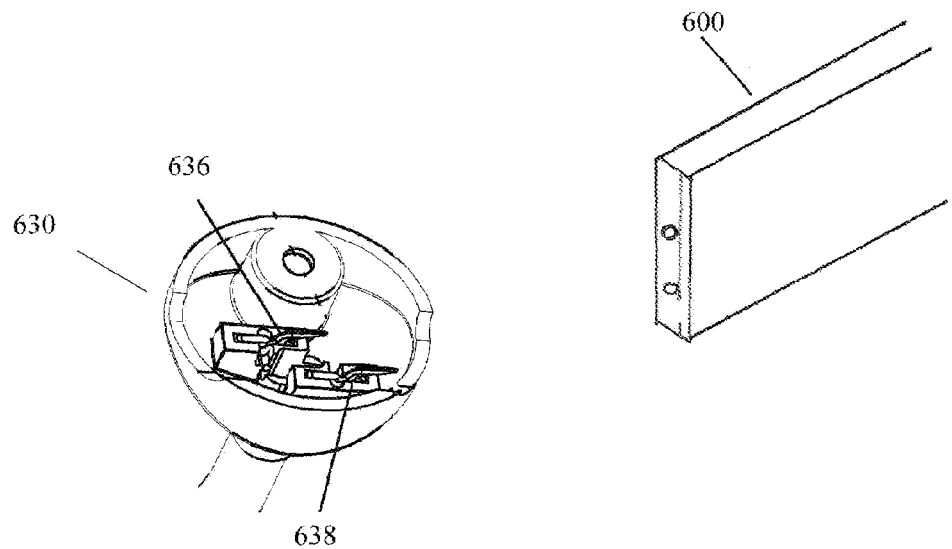
FIG. 29 is a close up view of the bottom of the light fixture of FIG. 27 for attachment to a track 600.
Figure 30:
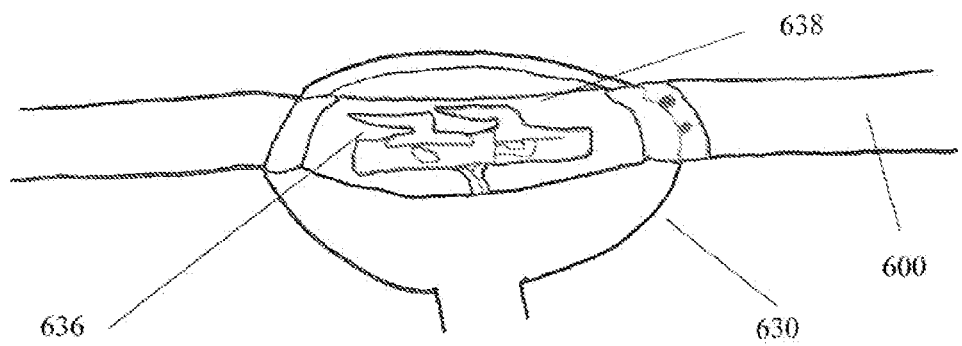
FIG. 30 is a cutaway view of the light fixture of FIG. 27 attached to the track 600.
Figure 31:
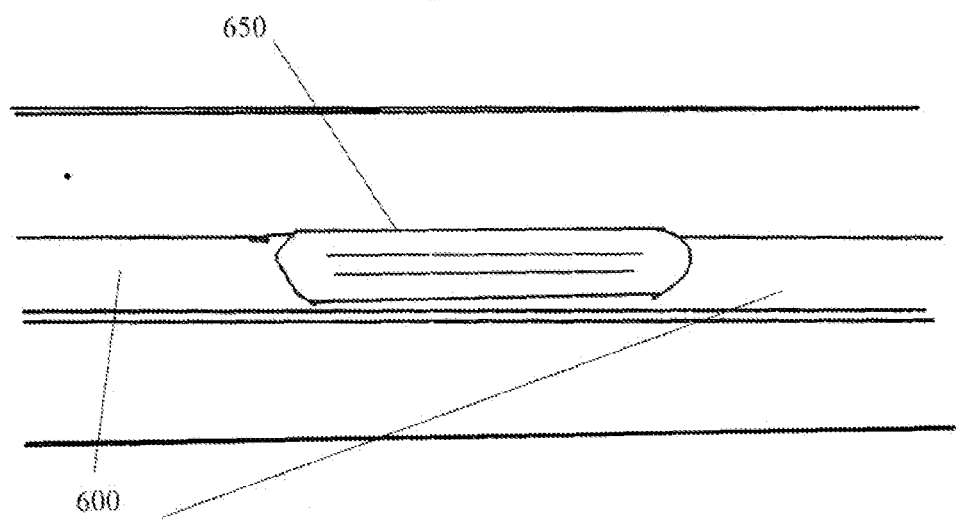
FIG. 31 is a top view of the light fixture of FIG. 27 on track 600.
Figure 32:
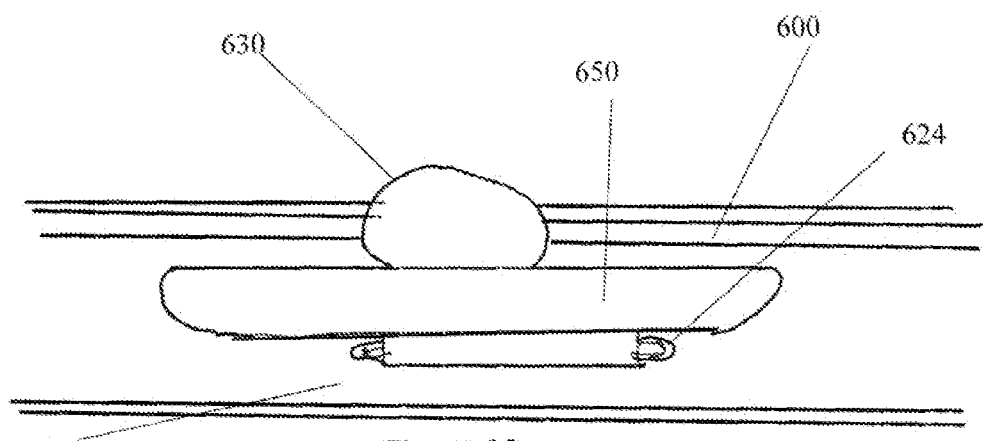
FIG. 32 is a side view of the light fixture of FIG. 27.
Figure 33:
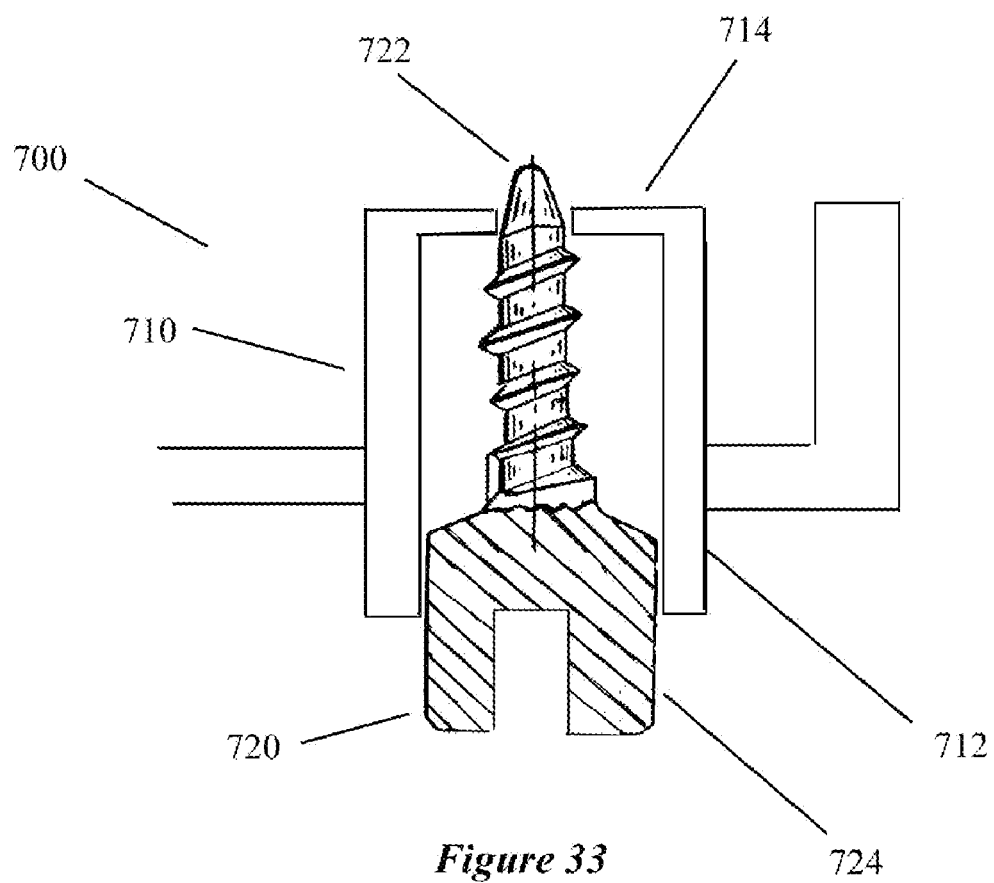
FIG. 33 is a side view of a screw for mounting the light fixture to a hard surface.

Another preferred embodiment of the fixture is shown in FIGS. 21 and 22. This fixture 830 is similar to fixture 800, except that spring clip members 832, 834 are at the sides of fixture 830. The fixture 830 is easily installed by placing the fixture 830 at angle to the track 12 and pivoting the fixture 830 relative to the track until the spring clip members 832, 834 engage on the contact rails 24, 26.

In another preferred embodiment, the track and fixtures include magnetically opposing materials to align and/or engage the fixture to the track. It is to be expressly understood that other mechanisms for engaging the contact leads of the fixtures with contact rails of the track are also contemplated, such as by direct attachment through soldering; by clips, by piercing and other mechanisms.

Installation

In the preferred embodiment, the lighting strip 10 is supplied in rolls. In a preferred embodiment, the track 12 is provided in a compact package wrapped around the fixtures and other components as opposed in elongated boxes of the prior track systems. The appropriate length of the strip 10 is unrolled and cut to length with shears, scissors, knives or other commonly used utensils. The person installing the light strip simply removes the protective layer 22 from the adhesive strip 20, and the upper side of the track 12 is firmly pressed in the desired location. The entire lighting system can be installed with only the use of common household scissors or knives.

The use of the adhesive strip 20 provides full support along the entire length of the strips 12. This ensures that there will not be stress points along the strip 10, and there is no need to attempt to locate studs, rafters or other support members in the surface for attachment. Also, there is no need to drill and/or install anchors in the surface. The bendable property of the strips allow them to be installed over complex surfaces, around corners, even wrapped around vertical and horizontal beams and other surfaces including uneven surfaces. These systems can not only be used in household areas, but in commercial areas, trade shows and with the appropriate precautions, outdoors. These systems can be permanently installed or used as temporary lighting as well. There is no need for professional installation as these systems can be installed with little mechanical aptitude or even any tools.

The torsion box design of the track spreads the load of the fixtures over a wide area of the track and the adhesive strip. This provides a secure system that is also lightweight and low profile. The torsion box design also allows the track to be bent up and down while providing lateral integrity.

The preferred embodiment of the lighting strip of the present invention uses the adhesive strip as described. It is to be expressly understood that other mechanisms for attachment can be used as well, such as mechanical fasteners in high stress areas.

The bottom side 14 of the track 12 can either be painted to match the surface on which it is applied, or to provide accent to that surface. In a preferred embodiment, covers are supplied to prevent the contact rails 24, 26 from being painted. These covers can be quickly removed after the strip surfaces are painted to minimize fouling of the contact surfaces by paint. Also, decorative tape can be provided to mount onto the bottom side in the appropriate color or pattern as well. The low profile flat section of the track renders it essentially invisible when painted to match the surface upon which it is mounted.

Figure 6:
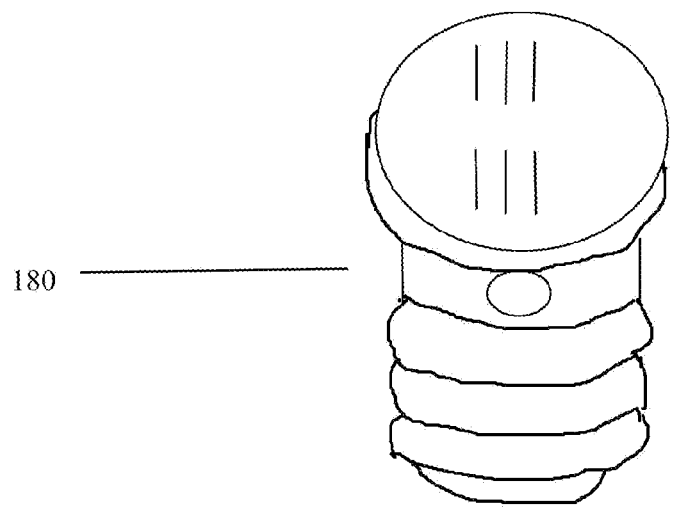
FIG. 6 shows a perspective cross-sectional view of the track of a preferred embodiment.

The connection clip can then be mounted on the track 12 as shown in FIG. 6. Multiple connection clips 34 may be used in order to connect different tracks to one another if desired. For example, it may be desired to install different strips at angles to one another, or to connect long runs of the strips together. Connection clips include contact members that engage the contact rails 24, 26 of the different strips 12 to one another in the appropriate polarity.

Light fixtures 80 can be quickly installed by hand at any desired location along the track 12. The fixtures 80 are mounted by grasping the spring clip members, engaging a first spring clip member onto a contact surface and pivoting the fixture until both spring clip members engage the contact surfaces. Current then can flow from the contact surfaces of the track through the clip members to the light bulb 54.

It is to be expressly understood that other engagement mechanisms can be used as well as well as different combinations of the spring contact clip members, spring clips and magnetic members.

In another preferred embodiment, the track lighting system includes an adaptor that engages in an existing incandescent light outlet and a cover. The adaptor is inserted into the existing light outlet, such as in a recessed ceiling outlet. The power strip is inserted into the adaptor and the adaptor and transformer are hidden within the recessed can. The cover is placed over the recessed can and painted to match the ceiling. The backing strip, connection members and light fixtures are mounted to the adjacent ceiling. The existing electrical controls then control the operation of the light fixtures.

It is to be expressly understood that the above described embodiments are provided for explanatory purposes and do not limit the claimed inventions to only these features, either alone or in different combinations.

What is claimed is:

1. An electrical track lighting system wherein said system comprises:
    a non-conductive track having an adhesive mounting surface for mounting said track to a surface;
    a first contact surface on said track adjacent said adhesive mounting surface
    a second contact surface on said track adjacent said adhesive mounting surface spaced from and parallel to said first contact surface;
    an insulation portion for insulating between said first contact surface of said track and said second contact surface of said track;
    an electrical power strip for supplying electrical power to said first contact surface and said second contact surface;
    an adhesive mounting strip on said power strip for mounting said power strip to a surface;
    a light fixture;
    a first contact surface affixed to said light fixture;
    a second contact surface affixed to said light fixture; and
    an attachment mechanism for attaching said light fixture to said track so that said first contact surface on said track engages said first contact surface on said light fixture and said second contact surface on said track engages said second contact of said light fixture.

2. The electrical track lighting system of claim 1 wherein said first and second contact surfaces include:
    flat contact surfaces.

3. The electrical lighting system of claim 1 wherein said system includes:
    said track and said adhesive mounting surface are bendable.

4. The electrical track lighting system of claim 1 wherein said attachment mechanism includes:
    said first contact surface on said light fixture formed on a first spring clip member; and
    said second contact surface on said light fixture formed on a second spring clip member.

5. The electrical track lighting system of claim 1 wherein said electrical supply includes:
    a low-voltage power supply.

6. The electrical track lighting system of claim 1 wherein said track includes:
    said track that is bendable in at least non-lateral directions.

7. An electrical track lighting system wherein said system comprises:
    a non-conductive track having an adhesive mounting surface;
    said track having a torsion box construction to allow bending in non-lateral directions and rigid support torsionally
    a first contact surface on said track adjacent said adhesive mounting surface a second contact surface on said track adjacent said adhesive mounting surface spaced from and parallel to said first contact surface;

an electrical power strip for supplying electrical power to said first contact surface and said second contact surface;

an adhesive mounting strip on said power strip for mounting said power strip to a surface;

a light fixture;

a first contact surface affixed to said light fixture;

a second contact surface affixed to said light fixture; and an attachment mechanism for attaching said light fixture to said track so that said first contact surface on said track engages said first contact surface on said light fixture and said second contact surface on said track engages said second contact of said light fixture.

8. The electrical track lighting system of claim 1 wherein said system includes:

an angularly adjustable connection mechanism for connecting said track and said power strip at any desired angle.

9. The electrical track lighting system of claim 1 wherein said system includes:

a mechanism for allowing a user to adjust the length of said power strip.

10. The electrical track lighting system of claim 1 wherein said system includes:

an electrical power supply;

a power cord connecting said electrical power supply to an electrical source;

an adjustment mechanism to adjust the spacing between said track, said power strip; said power supply and said power cord.

11. The electrical track lighting system of claim 10 wherein said adjustment mechanism includes:

a connection mechanism on said power supply to allow said power strip to be cut to a desired length; and a length adjustment mechanism on said power cord to allow said power cord to be cut to a desired length.

12. The electrical track lighting system of claim 1 wherein said track includes:

magnetic strips of opposing polarity for providing alignment for said fixtures.

13. The electrical track lighting system of claim 1 wherein said first contact surface affixed to said track and said second contact surface affixed to said track are affixed to an upper surface on said track.

14. The electrical track lighting system of claim 1 wherein said system includes:

an adaptor for connection into an existing light system.

15. The electrical track lighting system of claim 1 wherein said system includes:

an adaptor for connection into an existing recessed light system; and a cover for covering said adaptor.

16. The electrical track lighting system of claim 1 wherein said system includes:

a flat portion of said track being substantially smooth to blend into the surrounding environment.

17. The electrical track lighting system of claim 1 wherein said system includes:

a flat lower surface on said track.

18. An electrical track lighting system wherein said system comprises:

a low profile track having a bendable foam portion that is bendable at least in non-lateral directions;

said track having an upper surface and a lower surface;

an adhesive mounting surface on said upper surface;

two parallel and spaced electrically conductive surfaces on said upper surface;

a mechanism for supplying electrical power to said conductive surfaces; and at least one light fixture having an attachment mechanism for engagement with said two conductive surfaces on said track.

19. The system of claim 18 wherein said mechanism for supplying electrical power to said conductive surfaces includes:

a power strip for connection to said conductive surfaces; and and adhesive mounting surface on said power strip for mounting said power strip to a surface.

20. The system of claim 18 wherein said mechanism for supplying electrical power to said conductive surface includes:

a power strip for connection to said conductive surfaces;

a mechanism for adjusting the length of said power strip;

a power supply;

a power cord for connecting said power supply to an electrical source; and a mechanism for adjusting the length of said power cord.

21. The system of claim 18 wherein said low profile bendable track includes:

said lower surface of said track being substantially smooth and paintable after mounting to blend into a surrounding environment.

22. The system of claim 18 wherein said system includes:

an adaptor for connecting said system into an existing light system.

23. The system of claim 18 wherein said system includes:

an adaptor for connecting said system into an existing recessed light system; and a cover for covering said adaptor.

24. The system of claim 18 wherein said system further includes:

a connection clip having an angularly adjustable housing for connecting said track at any desired angle to other components of said system.

25. The system of claim 18 wherein said system further includes:

a power strip for supplying electrical current between the components of said system; and a mechanism for adjusting the length of said power strip between the components of said system.

26. The system of claim 18 wherein said conductive surfaces include:

a flat configuration.

27. An electrical track lighting system wherein said system comprises:

a low profile track that is bendable at least in non-lateral directions;

said track having a torsion box configuration to allow bending in only non-lateral directions;

said track having an upper surface and a lower surface;

an adhesive mounting surface on said upper surface;

two parallel and spaced electrically conductive surfaces on said upper surface;

a mechanism for supplying electrical power to said conductive surfaces; and at least one light fixture having an attachment mechanism for engagement with said two conductive surfaces on said track.

28. The system of claim 18 wherein said track includes:

a substantially flat lower surface.

29. The system of claim 18 wherein said attachment mechanism for said at least one light fixture includes:
a spring mechanism for securing said at least one light fixture onto said two conductive surfaces.

30. An electrical track lighting system wherein said system comprises:
a track having a torsion box hollow construction to provide rigidity and support;
an adhesive mounting surface on an upper surface of said track;
a first contact surface on said track;
a second contact surface on said track spaced from and parallel to said first contact surface;
an electrical supply for supplying electrical power to said first contact surface and said second contact surface;
a light fixture;
a first contact surface affixed to said light fixture;
a second contact surface affixed to said light fixture; and
an attachment mechanism for attaching said light fixture to said track so that said first contact surface on said track engages said first contact surface on said light fixture and said second contact surface on said track engages said second contact of said light fixture.

31. The electrical track lighting system of claim 30 wherein said first and second contact surfaces include:
flat contact surfaces.

32. The electrical track lighting system of claim 30 wherein said adhesive mounting surface includes:
an adhesive surface for mounting said track to a surface; and
an insulation portion for insulating between said first contact surface of said track and said second contact surface of said track.

33. The electrical lighting system of claim 30 wherein said system includes:
a power strip for supplying power between the components of said system; and
a mechanism for adjusting the length of said power strip.

34. The electrical lighting system of claim 30 wherein said system includes:
a power strip for supplying power to said conductive surfaces; and
an adhesive mounting surface on said power strip for fastening said power strip to a surface.

35. The electrical track lighting system of claim 30 wherein said track includes:
a track that is bendable in at least non-lateral directions.

36. The electrical track lighting system of claim 30 wherein said system includes:
an angularly adjustable connection mechanism for connecting said track at any desired angle to other components of said system.

37. A method for installing an electrical track lighting system, said method comprising the steps of:
providing a track that is bendable in non-lateral directions while torsionally rigid and having at least two conductor contact surfaces;
providing an adhesive mechanism for mounting said track to a surface;
providing at least one light fixture having two conductor contact surfaces; and
providing an attachment mechanism for attaching said at least one light fixture to said track so that said two conductor contact surfaces of said light fixture engage said two conductor contact surfaces of said track.

38. The method of claim 37 wherein said step of providing an attachment mechanism includes:
providing a spring clip member having one of said two conductor contact surfaces.

39. The method of claim 37 wherein said method further comprises:
providing a power strip for connecting to said conductive surfaces; and
providing an adhesive mounting surface on said power strip for fastening said power strip to a surface.

40. The method of claim 37 wherein said method further comprises:
providing an angularly adjustable connection mechanism for connecting said track to an electrical source at any desired angle.

41. A method for installing an electrical track lighting system having a track that is bendable in non-lateral directions while torsionally rigid and with two conductor contact surfaces, a power strip providing electrical current to said track and at least one light fixture having two conductor contact surfaces, said method comprising the steps of:
cutting said track to a desired length;
mounting said track onto a surface by an adhesive mounting strip;
cutting said power strip to length;
mounting said power strip to a surface by an adhesive mounting strip;
connecting said power strip to said track;
engaging said at least one light fixture so that said conductor contact surface of one of said conductor contact surfaces of said at least one light fixture engages one of said two conductor contact surfaces of said bendable track and the other said conductor contact surface of the other of said conductor contact surfaces of said at least one light fixture engages the other conductor contact surface of said bendable contact surface.

42. The method of claim 41 wherein said track includes an adhesive strip and said method further comprises:
mounting said track by securing said adhesive strip to the surface on which said track is to be mounted.

43. The method of claim 41 wherein said at least one light fixture includes:
a spring clip member for engaging said light fixture onto said track.

44. The method of claim 41 wherein said method further includes:
providing an adaptor for inserting into an existing light outlet; and
connecting said electrical conductor surfaces to said adaptor so that said light fixtures are controlled by an existing light system.

45. The method of claim 41 wherein said method further includes:
providing an adaptor for inserting into an existing recessed light outlet;
covering said adaptor within said existing recessed light outlet; and
connecting said electrical conductor surfaces to said adaptor so that said light fixtures are controlled by an existing light system.

* * * * *